United States Patent
Fujiwara et al.

(10) Patent No.: US 8,446,246 B2
(45) Date of Patent: May 21, 2013

(54) METAL OXIDE SINTERED COMPACT FOR THERMISTOR, THERMISTOR ELEMENT, THERMISTOR TEMPERATURE SENSOR, AND MANUFACTURING METHOD FOR METAL OXIDE SINTERED COMPACT FOR THERMISTOR

(75) Inventors: Kazutaka Fujiwara, Ibaraki (JP); Toshiaki Fujita, Ibaraki (JP)

(73) Assignee: Mitsubishi Materials Corporation, Tokyo (JP)

( * ) Notice: Subject to any disclaimer, the term of this patent is extended or adjusted under 35 U.S.C. 154(b) by 270 days.

(21) Appl. No.: 12/452,924

(22) PCT Filed: Jul. 31, 2008

(86) PCT No.: PCT/JP2008/002052
§ 371 (c)(1),
(2), (4) Date: Jan. 28, 2010

(87) PCT Pub. No.: WO2009/019833
PCT Pub. Date: Feb. 12, 2009

(65) Prior Publication Data
US 2010/0134238 A1 Jun. 3, 2010

(30) Foreign Application Priority Data
Aug. 3, 2007 (JP) .................. 2007-202850

(51) Int. Cl.
*H01C 7/10* (2006.01)

(52) U.S. Cl.
USPC .............. 338/22 SD; 338/22 R; 252/520.5

(58) Field of Classification Search .............. 338/22 R, 338/28, 22 SD; 252/500, 520.5, 519.2
See application file for complete search history.

(56) References Cited

U.S. PATENT DOCUMENTS

| | | | |
|---|---|---|---|
| 4,013,592 A | 3/1977 | Matsuoka et al. | |
| 4,891,158 A * | 1/1990 | Hata | 252/518.1 |
| 6,143,207 A * | 11/2000 | Yamada et al. | 252/515 |
| 6,740,261 B1 * | 5/2004 | Ogata et al. | 252/520.5 |
| 7,656,269 B2 * | 2/2010 | Mizoguchi et al. | 338/22 R |
| 2006/0267614 A1 * | 11/2006 | Lee et al. | 324/760 |

FOREIGN PATENT DOCUMENTS

| | | |
|---|---|---|
| JP | 51-095297 A | 8/1976 |
| JP | 57-113201 A | 7/1982 |
| JP | 63319250 | 12/1988 |
| JP | 6316457 | 11/1994 |
| JP | 7134999 | 5/1995 |
| JP | 7296839 | 11/1995 |
| JP | 8268750 | 10/1996 |
| SU | 998424 A1 | 2/1983 |

OTHER PUBLICATIONS

International Search Report for Corresponding International Application No. PCT/JP2008/002052, completed on Aug. 19, 2008.

(Continued)

*Primary Examiner* — Kyung Lee
(74) *Attorney, Agent, or Firm* — Edwards Wildman Palmer LLP; Jeffrey D. Hsi; Weiying Yang

(57) ABSTRACT

A metal oxide sintered compact used for a thermistor includes a composite oxide represented by the general expression $La(Cr_{1-x}Mn_x)O_3$ (with x=0.0 to 0.6). Furthermore, the thermistor element 3 includes the metal oxide sintered compact 2 for a thermistor and a pair of leads 1, one terminal of each of which is fixed to the metal oxide sintered compact 2 for a thermistor.

15 Claims, 2 Drawing Sheets

OTHER PUBLICATIONS

M. Xiao et al., Study on the Electrical Properties of $LaCr_{1-x}Mn_xO_3$ ceramics, Journal of Hubei Univ. (Natural Science Edition), vol. 23, Sep. 3, 2001, 230-233.

Office Action dated Mar. 23, 2012 issued in corresponding Chinese Application No. 200880101012.6.
Office Action received on Oct. 2, 2012 in corresponding Japanese Patent Application No. 2008-185124.

* cited by examiner

US 8,446,246 B2

METAL OXIDE SINTERED COMPACT FOR THERMISTOR, THERMISTOR ELEMENT, THERMISTOR TEMPERATURE SENSOR, AND MANUFACTURING METHOD FOR METAL OXIDE SINTERED COMPACT FOR THERMISTOR

CROSS-REFERENCE TO RELATED APPLICATIONS

This application is the national stage application pursuant to 35 U.S.C. §371 of PCT application PCT/JP2008/002052, filed Jul. 31, 2008, which claims the benefit of Japanese Patent Application No. 2007-202850, filed Aug. 3, 2007. The entire contents of the aforementioned applications are hereby incorporated herein by reference.

TECHNICAL FIELD

The present invention relates to a metal oxide sintered compact for a thermistor, a thermistor element, a thermistor temperature sensor, and a manufacturing method for a metal oxide sintered compact for a thermistor, used for temperature measurement in an automobile or the like, for example.

The present application claims priority from Japanese Patent Application No. 2007-202850 filed on Aug. 3, 2007, in Japan, the disclosed content of which is hereby incorporated by reference into the present application.

BACKGROUND ART

In general, a thermistor temperature sensor is employed as a temperature sensor for measuring the temperature of a catalyst, the temperature in an exhaust system, or the like, around an engine installed in an automobile. A thermistor element used for such a thermistor temperature sensor is useful as a temperature sensor for the aforementioned automobile related techniques, and for information equipment, communication equipment, medical equipment, household equipment, etc., for example. Such a thermistor element employs an element formed of a semiconductor oxide sintered compact having a large negative temperature coefficient.

In conventional techniques, various thermistor elements formed of various kinds of metal oxide sintered compacts have been used. Examples of typical materials include $Y(Cr, Mn)O_3$ perovskite oxide, for example, as described in Patent Document 1 and Non-patent Document 1.
[Patent Document]
Japanese Patent Application Publication No. 3362651
[Non-Patent Document]
Kurano, "Development of temperature sensor for controlling $NO_x$ catalyst", DENSO TECHNICAL REVIEW, Vol. 5, No. 2, 2000.

DISCLOSURE OF INVENTION

Problems to be Solved by the Invention

The following problem remains in the aforementioned conventional techniques.

Measurement of the temperature of a catalyst around an automobile engine requires a thermistor element which is capable of measuring high temperatures up to around 1000° C. It is an essential characteristic of such a high-temperature thermistor that change in the resistance must be small in a high temperature range. However, the aforementioned conventional materials exhibit a fairly large reduction in the resistance in a test in which they are maintained at a high temperature, leading to a problem in that there are conditions in which such conventional materials cannot be used depending on the usage.

The present invention has been made in order to solve the aforementioned problem. Accordingly, it is a purpose of the present invention to provide a metal oxide sintered compact for a thermistor, a thermistor element, a thermistor temperature sensor, and a manufacturing method for a metal oxide sintered compact for a thermistor, which provide small change in resistance even at high temperature of around 1000° C., thereby providing improved reliability.

Means for Solving the Problems

The present inventors have diligently studied Mn perovskite oxide. As a result, it has been discovered that the percentage of change in resistance changes depending on the element positioned at the A site. In particular, it has been discovered that the change in resistance is dramatically reduced by employing La as the element positioned at the A site. However, in a case in which La is employed as the element positioned at the A site, $La_2O_3$, which is used as a raw material, readily remains unreacted. Accordingly, in some cases, a hydroxide is later generated, leading to an unstable state. However, the occurrence of such unreacted $La_2O_3$ can be prevented by replacing the La site with another element, or by overadding another element as compared with La.

Thus, the present invention has been made based upon the aforementioned findings, and the following arrangements are employed in order to solve the aforementioned problem.

That is to say, a metal oxide sintered compact for a thermistor according to the present invention is a metal oxide sintered compact used for a thermistor, including a composite oxide represented by the general expression $La(Cr_{1-x}Mn_x)O_3$ (with x=0.0 to 0.6).

The metal oxide sintered compact includes a composite oxide represented by the general expression $La(Cr_{1-x}Mn_x)O_3$ (with x=0.0 to 0.6). Accordingly, La is positioned at the A site as a Mn-perovskite oxide, thereby reducing the possibility of the entrance and exit of oxygen. Furthermore, the proportion of Mn is set to 0.6 or less, thereby significantly suppressing change in the resistance. It should be noted that oxygen deficiency readily occurs in a region having a large proportion of Mn (Mn>0.6), leading to a large change in the resistance.

It should be noted that an arrangement is preferably made as represented by the general expression according to the present invention with x=0.2 to 0.6.

Also, a metal oxide sintered compact for a thermistor according to the present invention includes a sintered compact represented by the general expression $(La_{1-y}Y_y)(Cr_{1-x}Mn_x)O_3$ (with x=0.0 to 0.6, y=0.05 to 0.95).

That is to say, the metal oxide sintered compact for a thermistor is formed of a sintered compact represented by the general expression $(La_{1-y}Y_y)(Cr_{1-x}Mn_x)O_3$ (with x=0.0 to 0.6, y=0.05 to 0.95). Thus, almost no $La_2O_3$ remains in the form of unreacted material in the sintered compact, thereby suppressing a factor leading to instability due to hydroxide of La that occurs in a later stage.

It should be noted that an arrangement is more preferably made represented by the general expression according to the present invention, with x=0.2 to 0.6. and with y=0.2 to 0.95.

Also, a metal oxide sintered compact for a thermistor according to the present invention includes a sintered compact represented by the general expression $(1-y)\cdot La(Cr_{1-x}Mn_x)O_3 + y\cdot Mn_2CrO_4$ (with x=0.0 to 0.6, y=0.05 to 0.95). That is to say, the metal oxide sintered compact for a thermistor is formed of a mixture sintered compact represented by the general expression $(1-y)\cdot La(Cr_{1-x}Mn_x)O_3 + y\cdot Mn_2CrO_4$ (with x=0.0 to 0.6, y=0.05 to 0.95) Thus, almost no $La_2O_3$ remains in the form of unreacted material in the sintered compact, thereby suppressing a factor leading to instability due to hydroxide of La that occurs in a later stage.

It should be noted that an arrangement is more preferably made represented by the general expression according to the present invention, with x=0.2 to 0.6. and with y=0.1 to 0.95.

Also, in a metal oxide sintered compact for a thermistor according to the present invention, the composite oxide contains $Y_2O_3$. That is to say, in the metal oxide sintered compact for a thermistor, the composite oxide contains $Y_2O_3$ which is an insulating material, thereby providing high resistance in a simple manner by adding $Y_2O_3$.

A thermistor element according to the present invention includes: the metal oxide sintered compact for a thermistor according to the present invention described above; and a pair of leads, one terminal of each of which is fixed to the metal oxide sintered compact for a thermistor. That is to say, with the thermistor element, only such a single thermistor temperature element is required to cover the measurement of a wide temperature range. In particular, the change in resistance is small even at a high temperature of around 1000° C., thereby providing stable temperature measurement.

The thermistor temperature sensor according to the present invention includes a thermistor element according to the present invention described above. That is to say, the thermistor temperature sensor includes a thermistor element according to the present invention described above. Thus, the change in properties is small over time in a high-temperature region, thereby providing sufficient measurement precision over a wide temperature range from low temperature region up to high temperature. In particular, such a thermistor temperature sensor is suitably employed as a high-temperature measurement sensor for measuring the temperature of a catalyst, the temperature in an exhaust system, or the like, around an engine installed in an automobile.

A manufacturing method for a metal oxide sintered compact for a thermistor according to the present invention is a manufacturing method for a metal oxide sintered compact used for a thermistor including a step in which $La_2O_3$, $Cr_2O_3$, $MnO_2$ provided in the form of powder are mixed and calcined so as to obtain calcined powder of composite oxide represented by the general expression $La(Cr_{1-x}Mn_x)O_3$ (with x=0.0 to 0.6).

Also, a manufacturing method for a metal oxide sintered compact for a thermistor according to the present invention, includes a step in which $La_2O_3$, $Cr_2O_3$, $MnO_2$, and $Y_2O_3$, provided in the form of powder, are mixed and calcined so as to obtain mixture calcined powder represented by $(La_{1-y}Y_y)(Cr_{1-x}Mn_x)O_3$ (with x=0.0 to 0.6, y=0.05 to 0.95).

Also, a manufacturing method for a metal oxide sintered compact for a thermistor according to the present invention, includes: a step in which $Cr_2O_3$, $MnO_2$, and $Y_2O_3$, provided in the form of powder, are further added to and mixed with the aforementioned calcined powder, and the mixture is calcined so as to obtain calcined powder represented by the general expression $(La_{1-y}Y_y)(Cr_{1-x}Mn_x)O_3$ (with x=0.0 to 0.6, y=0.05 to 0.95); and a step in which the calcined powder thus obtained is molded and sintered. That is to say, with the manufacturing method for a metal oxide sintered compact for a thermistor, $La(Cr_{1-x}Mn_x)O_3$ is synthesized, following which the material thus synthesized is mixed with $Cr_2O_3$, $MnO_2$, and $Y_2O_3$, and the mixture is sintered. This encourages a reaction between unreacted $La_2O_3$, $Cr_2O_3$, and $MnO_2$, thereby preventing $La_2O_3$ from remaining unreacted. Furthermore, the surplus $Cr_2O_3$, $MnO_2$, and $Y_2O_3$ form stable $Y(Cr, Mn)O_3$, thereby providing $(La_{1-y}Y_y)(Cr_{1-x}Mn_x)O_3$ (with x=0.0 to 0.6, y=0.05 to 0.95) in the final stage.

Also, a manufacturing method for a metal oxide sintered compact for a thermistor according to the present invention is a manufacturing method for a metal oxide sintered compact used for a thermistor, including: a step in which $La_2O_3$, $Y_2O_3$, $Cr_2O_3$, and $MnO_2$, provided in the form of powder, are mixed and calcined so as to obtain calcined powder of a composite oxide represented by $(La_{1-y}Y_y)(Cr_{1-x}Mn_x)O_3$ (with x=0.0 to 0.6, y=0.05 to 0.95); and a step in which the calcined powder thus obtained is molded and sintered.

A manufacturing method for a metal oxide sintered compact for a thermistor according to the present invention is a manufacturing method for a metal oxide sintered compact used for a thermistor, including a step in which mixture powder obtained by adding surplus quantity of $Cr_2O_3$ and $MnO_2$ as compared with $La_2O_3$ is sintered so as to obtain a mixture sintered compact represented by the general expression $(1-y)\cdot La(Cr_{1-x}Mn_x)O_3 + y\cdot Mn_2CrO_4$ (with x=0.0 to 0.6, y=0.05 to 0.95). That is to say, with the manufacturing method for a metal oxide sintered compact for a thermistor, $Cr_2O_3$ and $MnO_2$ are overadded in a $La_2O_3$-poor state in order to reduce unreacted $La_2O_3$ to as small an amount as possible, and $Mn_2CrO_4$ is synthesized using the remaining $Cr_2O_3$ and $MnO_2$, thereby forming a mixture sintered compact containing $La(Cr, Mn)O_3$ and $Mn_2CrO_4$ as its principal components. Such an arrangement is capable of suppressing a factor leading to instability due to a hydroxide of remaining La.

Advantages

The present invention provides the following advantage.

That is to say, with a metal oxide sintered compact for a thermistor and a manufacturing method for such a metal oxide sintered compact for a thermistor according to the present invention, such an arrangement includes, as a Mn-perovskite oxide, a composite oxide represented by the general expression $La(Cr_{1-x}Mn_x)O_3$ (with x=0.0 to 0.6) containing La positioned at the A site. Thus, such an arrangement reduces the probability of the entrance and exit of oxygen, thereby significantly reducing change in the resistance. Thus, with the thermistor element and the thermistor temperature sensor including such a thermistor element according to the present invention, the change in properties in a high temperature range is small over time, thereby providing measurement with sufficient precision over a wide temperature range from low temperature range up to high temperature. In particular, such an arrangement is suitably employed as a high-temperature measurement sensor for measuring the temperature of a catalyst, the temperature in an exhaust system, or the like, around an engine installed in an automobile.

Figure 1:
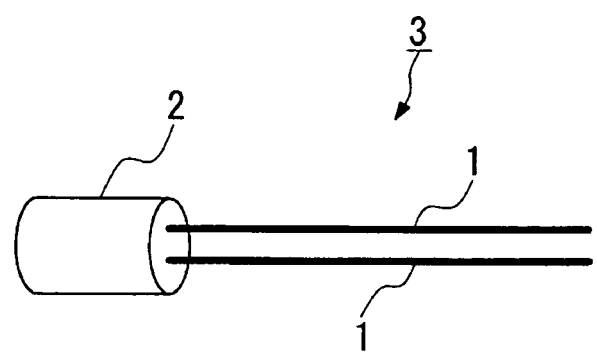
FIG. 1 is a perspective view which shows a thermistor element with respect to a metal oxide sintered compact, a thermistor element, a thermistor temperature sensor, and a manufacturing method for a metal oxide sintered compact for a thermistor, according to an embodiment of the present invention.

| Reference Numerals | |
|---|---|
| 1 | lead |
| 2 | metal oxide sintered compact for a thermistor |
| 3 | thermistor element |
| 6 | casing |
| 7 | thermistor temperature sensor |

BEST MODE FOR CARRYING OUT THE INVENTION

Description will be made below regarding embodiments with respect to a metal oxide sintered compact for a thermistor, a thermistor element, a thermistor temperature sensor, and a manufacturing method for a metal oxide sintered compact for a thermistor, according to the present invention.

A metal oxide sintered compact for a thermistor according to a first embodiment is a metal oxide sintered compact used for a thermistor, and contains, as a principal component, a composite oxide represented by the general expression $La(Cr_{1-x}Mn_x)O_3$ (with x=0 to 0.6).

Description will be made below with reference to FIG. 1 and FIG. 2 regarding a manufacturing method for the metal oxide sintered compact for a thermistor, a manufacturing method for a thermistor element and a thermistor temperature sensor employing the aforementioned metal oxide sintered compact for a thermistor, and the configurations thereof.

First, powders of $La_2O_3$, $Cr_2O_3$, and $MnO_2$, are introduced into a ball mill after weighing. Subsequently, appropriate quantities of Zr balls and pure water are added, following which mixing is performed for approximately 24 hours. After the mixture extracted from the ball mill is dried, the mixture is calcined at 1100° C. for five hours, thereby obtaining calcined powder represented by the aforementioned general expression, for example, with x=0.5, i.e., by the expression $La(Cr_{0.5}, Mn_{0.5})O_3$.

Next, the aforementioned calcined mixture powder is milled by a ball mill similar to the aforementioned one. After the mixture thus milled is dried, PVA (10% by weight polyvinyl alcohol in an aqueous solution) is added to the mixture to 5% by weight, following which the mixture is dried. The mixture thus dried is granulated by being passed through a sieve, the openings of which have a diameter of 60 μm. Subsequently, each grain thus formed is lightly shaped using a mold having two holes, following which one end of each of a pair of leads 1, which are platinum needles having a diameter of 0.3 mm, is inserted into the calcined mixture thus shaped, as shown in FIG. 1.

Subsequently, shaping is performed under pressure (1000 kg/cm²) applied along a single axis so as to embed and fix the leads 1 within the calcined powder. Next, binder removal processing is performed and the calcined powder is sintered at approximately 1500° C., thereby obtaining a thermistor element 3 having a thermistor metal oxide sintered compact 2, which is a sintered compact represented by the expression $La(Cr_{0.5}, Mn_{0.5})O_3$, and a pair of leads 1.

Figure 2:
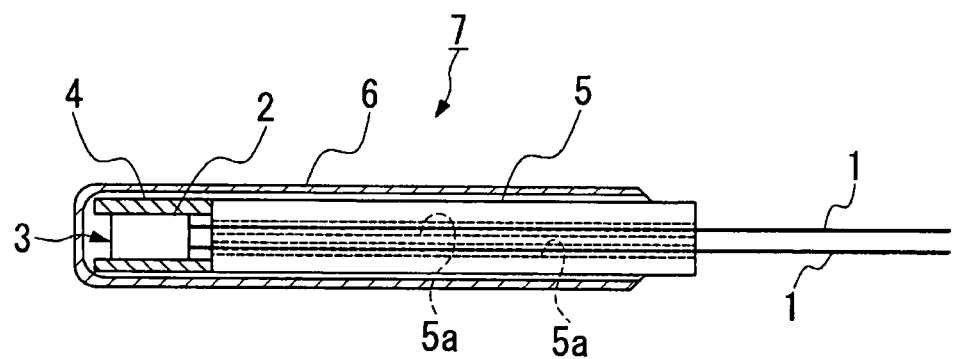
FIG. 2 is a cross-sectional view which shows a thermistor temperature sensor according to the present embodiment.

Next, as shown in FIG. 2, a tube 4 formed of insulating ceramic is fit to the thermistor metal oxide sintered compact 2 so as to surround the outer face of the thermistor metal oxide sintered compact 2. Furthermore, two leads 1 are each passed through two holes 5a of a two-hole insulator tube 5 formed of alumina such that the leads 1 are protected up to their roots by the two-hole insulator tube 5. Subsequently, the thermistor element 3 in this state is inserted into a stainless casing 6 in a cylindrical form having a closed tip, which ensures that the thermistor element 3 remains airtight, thereby obtaining a thermistor temperature sensor 7.

As described above, with the present embodiment, the metal oxide sintered compact 2 for a thermistor, which forms the thermistor element 3, contains a composite oxide represented by the general expression $La(Cr_{1-x}Mn_x)O_3$ (with x=0.0 to 0.6). Accordingly, the metal oxide sintered compact 2 is provided as a perovskite oxide having a structure in which La is positioned at the A site, thereby reducing the possibility of the entrance and exit of oxygen. Furthermore, the proportion of Mn is set to 0.6 or less, thereby significantly suppressing change in the resistance.

A metal oxide sintered compact for a thermistor according to a second embodiment is a metal oxide sintered compact used for a thermistor, and contains, as a principal component, a composite oxide represented by the general expression $La(Cr_{1-x}Mn_x)O_3$ (with x=0.0 to 0.6). More specifically, the metal oxide sintered compact for a thermistor according to the present embodiment is formed of a sintered compact represented by the general expression $(La_{1-y}Y_y)(Cr_{1-x}Mn_x)O_3$ (with x=0.0 to 0.6, y=0.05 to 0.95).

Description will be made below regarding a manufacturing method for such a metal oxide sintered compact for a thermistor and manufacturing methods for a thermistor element and a thermistor temperature sensor using such a metal oxide sintered compact, and the configurations thereof, with reference to FIG. 1 and FIG. 2.

First, powders of $La_2O_3$, $Cr_2O_3$, and $MnO_2$, are introduced into a ball mill after weighing. Subsequently, an appropriate quantity of Zr balls and pure water are added, following which mixing is performed for approximately 24 hours. After the mixture extracted from the ball mill is dried, the mixture is calcined at 1100° C. for five hours, thereby obtaining calcined powder represented by the aforementioned general expression with x=0.5, i.e., the following expression: $La(Cr_{0.5}, Mn_{0.5})O_3$. Furthermore, predetermined quantity of $Cr_2O_3$, $MnO_2$, and $Y_2O_3$ are added to the calcined powder, and mixed by the ball mill in the same way. Moreover, the calcined powder thus mixed is calcined at 1300° C., thereby forming a calcined powder represented by the aforementioned general expression $(La_{0.8}Y_{0.2})(Cr_{0.5}Mn_{0.5})O_3$ with y=0.2.

Next, the aforementioned calcined mixture powder is milled by a ball mill similar to the aforementioned one. After the mixture thus milled is dried, PVA (10% by weight of polyvinyl alcohol in an aqueous solution) is added to the mixture to 5% by weight, following which the mixture is dried. The mixture thus dried is granulated by being passed through a sieve, the openings of which have a diameter of 60 μm. Subsequently, each grain thus formed is lightly shaped using a mold having two holes, following which one end of each of a pair of leads 1, which are platinum needles having a diameter of 0.3 mm, are inserted into the calcined mixture thus shaped, as shown in FIG. 1.

Subsequently, shaping is performed under pressure (1000 kg/cm²) applied along a single axis so as to embed and fix the leads 1 within the calcined powder. Next, binder removal processing is performed and the calcined powder is sintered at approximately 1500° C., thereby obtaining a thermistor element 3 having a thermistor metal oxide sintered compact 2, which is a sintered compact represented by the expression $(La_{0.8}Y_{0.2})(Cr_{0.5}Mn_{0.5})O_3$, and a pair of leads 1.

Next, as shown in FIG. 2, a tube 4 formed of insulating ceramics is fit to the thermistor metal oxide sintered compact 2 so as to surround the outer face of the thermistor metal oxide sintered compact 2. Furthermore, two leads are each passed through two holes 5a of a two-hole insulator tube 5 formed of alumina such that the leads 1 are protected up to their roots by the two-hole insulator tube 5. Subsequently, the thermistor element 3 in this state is inserted into a stainless casing 6 in a cylindrical form having a closed tip, which ensures that the thermistor element 3 remains airtight, thereby obtaining a thermistor temperature sensor 7.

As described above, with the present embodiment, the metal oxide sintered compact 2 for a thermistor, which forms the thermistor element 3, contains a composite oxide represented by the general expression $La(Cr_{1-x}Mn_x)O_3$ (with x=0.0 to 0.6). Accordingly, the metal oxide sintered compact 2 is provided as a perovskite oxide having a structure in which La is positioned at the A site, thereby reducing the possibility of the entrance and exit of oxygen. Furthermore, the proportion of Mn is set to 0.6 or less, thereby significantly suppressing change in the resistance.

In the process for manufacturing the metal oxide sintered compact 2 for a thermistor according to the second embodiment, $La(Cr_{1-x}Mn_x)O_3$ is synthesized, following which the $La(Cr_{1-x}Mn_x)O_3$ thus synthesized is mixed with $Cr_2O_3$, $MnO_2$, and $Y_2O_3$, and the mixture is sintered. This encourages a reaction between unreacted $La_2O_3$, $Cr_2O_3$, and $MnO_2$, thereby reducing the $La_2O_3$ that remains in the form of unreacted material. Furthermore, the surplus $Cr_2O_3$, $MnO_2$, and $Y_2O_3$ form stable $Y(Cr, Mn)O_3$. Thus, in the final stage, a sintered compact is obtained, having $La(Cr, Mn)O_3$ and $Y(Cr, Mn)O_3$ as principal components or having $(La, Y)(Cr, Mn)O_3$ as a principal component. As described above, the metal oxide sintered compact 2 for a thermistor according to the present embodiment is provided as a sintered compact represented by the general expression $(La_{1-y}Y_y)(Cr_{1-x}Mn_x)O_3$ (with x=0.0 to 0.6, y=0.05 to 0.95). Thus, almost no $La_2O_3$ remains in the form of unreacted material in the sintered compact, thereby suppressing a primary factor leading to instability due to hydroxide of La that occurs in a later stage.

It should be noted that, although such an arrangement as described above is preferably made such that $La(Cr_{1-x}Mn_x)O_3$ is synthesized, following which the material thus synthesized is mixed with $Cr_2O_3$, $MnO_2$, and $Y_2O_3$, and the mixture is then calcined, an arrangement may also be made in which $La_2O_3$, $Cr_2O_3$, $MnO_2$, and $Y_2O_3$ are mixed and calcined at the same time, thereby obtaining a mixture of calcined powder represented by the expression $(La_{1-y}Y_y)(Cr_{1-x}Mn_x)O_3$ (with x=0.0 to 0.6, y=0.05 to 0.95).

Next, description will be made below regarding a third embodiment of a metal oxide sintered compact for a thermistor, a thermistor element, a thermistor temperature sensor, and a manufacturing method for a metal oxide sintered compact for a thermistor, according to the present invention.

The difference between the third embodiment and the second embodiment is as follows. That is to say, in the second embodiment, the metal oxide sintered compact 2 for a thermistor is formed as a mixture sintered compact represented by the expression $(La_{1-y}Y_y)(Cr_{1-x}Mn_x)O_3$ (with x=0.0 to 0.6, y=0.05 to 0.95). On the other hand, in the third embodiment, the metal oxide sintered compact 2 for a thermistor is synthesized as a mixture sintered compact represented by the expression $(1-y) \cdot La(Cr_{1-x}Mn_x)O_3 + y \cdot Mn_2CrO_4$ (with x=0.0 to 0.6, y=0.05 to 0.95).

Furthermore, there is also a difference between the third embodiment and the second embodiment as follows. That is to say, a manufacturing method for the aforementioned metal oxide sintered compact 2 for a thermistor according to the third embodiment has a step in which mixture powder obtained by overadding $Cr_2O_3$ and $MnO_2$ to $La_2O_3$ is calcined so as to obtain a mixture sintered compact represented by the aforementioned general expression $(1-y) \cdot La(Cr_{1-x}Mn_x)O_3 + y \cdot Mn_2CrO_4$ (with x=0.0 to 0.6, y=0.05 to 0.95).

That is to say, first, $Cr_2O_3$ and $MnO_2$ are overadded in a $La_2O_3$-poor state in order to reduce unreacted $La_2O_3$ to as small an amount as possible, and $Mn_2CrO_4$ is synthesized using the remaining $Cr_2O_3$ and $MnO_2$, thereby forming a mixture sintered compact containing $La(Cr, Mn)O_3$ and $Mn_2CrO_4$ as its principal components. For example, calcined powder is obtained as represented by the above general expression with x as 0.5, and with y as 0.1, i.e., $0.9 La(Cr_{0.5}Mn_{0.5})O_3 + 0.1 \cdot Mn_2CrO_4$.

Next, the aforementioned calcined mixture powder is milled by a ball mill similar to the aforementioned one. After the mixture thus milled is dried, PVA (10% by weight polyvinyl alcohol in an aqueous solution) is added to the mixture to 5% by weight, following which the mixture is dried. The mixture thus dried is granulated by being passed through a sieve, the openings of which have a diameter of 60 μm. Subsequently, each grain thus formed is lightly shaped using a mold having two holes, following which one end of each of a pair of leads 1, which are platinum needles having a diameter of 0.3 mm, is inserted into the calcined mixture thus shaped, as shown in FIG. 1.

Subsequently, shaping is performed under pressure (1000 kg/cm$^2$) applied along a single axis so as to embed and fix the leads 1 within the calcined powder. Next, binder removal processing is performed and the calcined powder is sintered at approximately 1500° C., thereby obtaining a thermistor element 3 having a thermistor metal oxide sintered compact 2, which is a sintered compact represented by the expression $0.9 La(Cr_{0.5}Mn_{0.5})O_3 + 0.1 \cdot Mn_2CrO_4$, and a pair of leads 1.

Next, as shown in FIG. 2, a tube 4 formed of insulating ceramic is fit to the thermistor metal oxide sintered compact 2 so as to surround the outer face of the thermistor metal oxide sintered compact 2. Furthermore, two leads 1 are each passed through two holes 5a of a two-hole insulator tube 5 formed of alumina such that the leads 1 are protected up to their roots by the two-hole insulator tube 5. Subsequently, the thermistor element 3 in this state is inserted into a stainless casing 6 in a cylindrical form having a closed tip, which ensures that the thermistor element 3 remains airtight, thereby obtaining a thermistor temperature sensor 7.

As described above, with the third embodiment, the metal oxide sintered compact 2 for a thermistor is provided as a mixture sintered compact represented by the general expression $(1-y) \cdot La(Cr_{1-x}Mn_x)O_3 + y \cdot Mn_2CrO_4$ (with x=0.0 to 0.6, y=0.05 to 0.95). Thus, unreacted $La_2O_3$ is very much reduced in the sintered compact. This suppresses a primary factor leading to instability due to remaining La, thereby obtaining a sintered compact having stable properties in a high-temperature environment.

EXAMPLES

Figure 3:
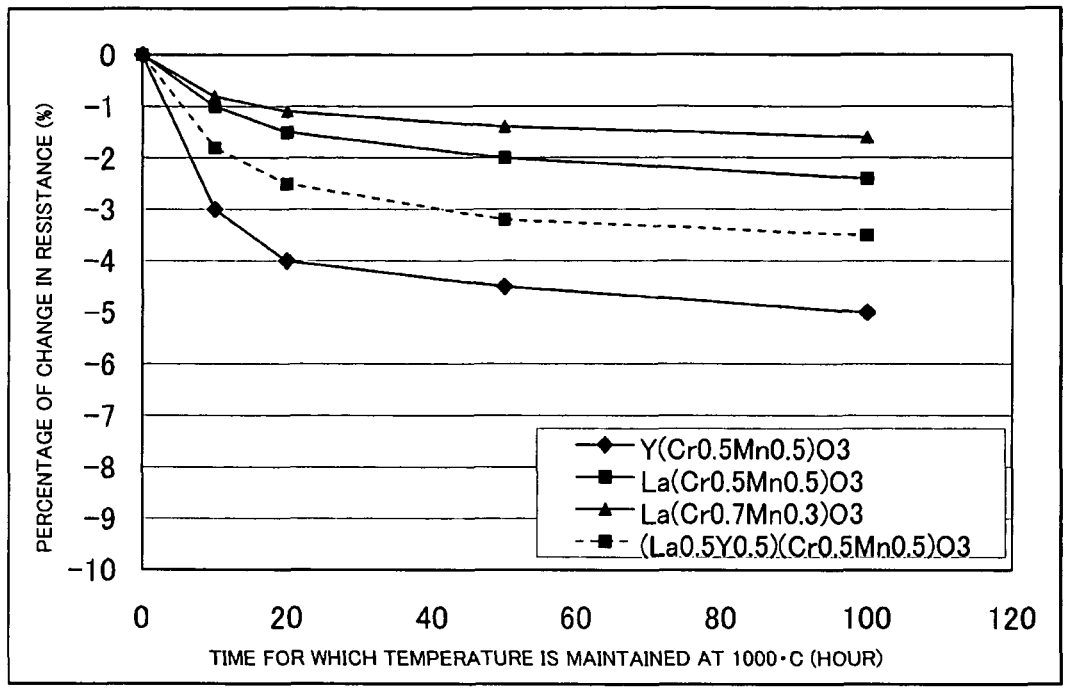
FIG. 3 is a graph which shows the percentage of change in resistance over storage time at 1000° C. for an example according to the present invention and a comparison example.

Next, specific description will be made with reference to FIG. 3 and FIG. 4 regarding evaluation results with respect to a metal oxide sintered compact for a thermistor, a thermistor element, a thermistor temperature sensor, and a manufacturing method for a metal oxide sintered compact for a thermistor, according to the present invention, which were obtained by evaluating actually manufactured examples.

According to the above-described first embodiment, the metal oxide sintered compact 2 for a thermistor containing La($Cr_{0.5}$, $Mn_{0.5}$)$O_3$ as a principal component was formed, and the thermistor temperature sensor 7 having the thermistor element 3 was manufactured as a prototype. The thermistor temperature sensor 7 was subjected to a high-temperature environment test. In this test, change in the resistance was measured over time in an environment in which the temperature was maintained at 1000° C. for 100 hours. The results are shown in FIG. 3. It should be noted that, as a comparison example, FIG. 3 also shows the results of the same test performed for a thermistor temperature sensor manufactured in the same manner, except that Y($Cr_{0.5}$, $Mn_{0.5}$)$O_3$ was employed as a conventional metal oxide sintered compact for a thermistor.

As can be understood from the test results, in a case in which Y($Cr_{0.5}$, $Mn_{0.5}$)$O_3$ was employed as in the conventional example, the percentage change in resistance is on the order of 5%, which is a large value, but with the thermistor temperature sensor 7 employing the metal oxide sintered compact 2 for a thermistor containing La($Cr_{0.5}$, $Mn_{0.5}$)$O_3$ as a principal component according to the present embodiment, the change in resistance is significantly reduced, to approximately 2%. As descried above, it can be understood that, with the present invention, the change in resistance is on the order of 2% even in an environment in which the temperature is maintained at 1000° C. for 100 hours, and thus it can be understood that the change in properties is very much reduced.

Figure 4:
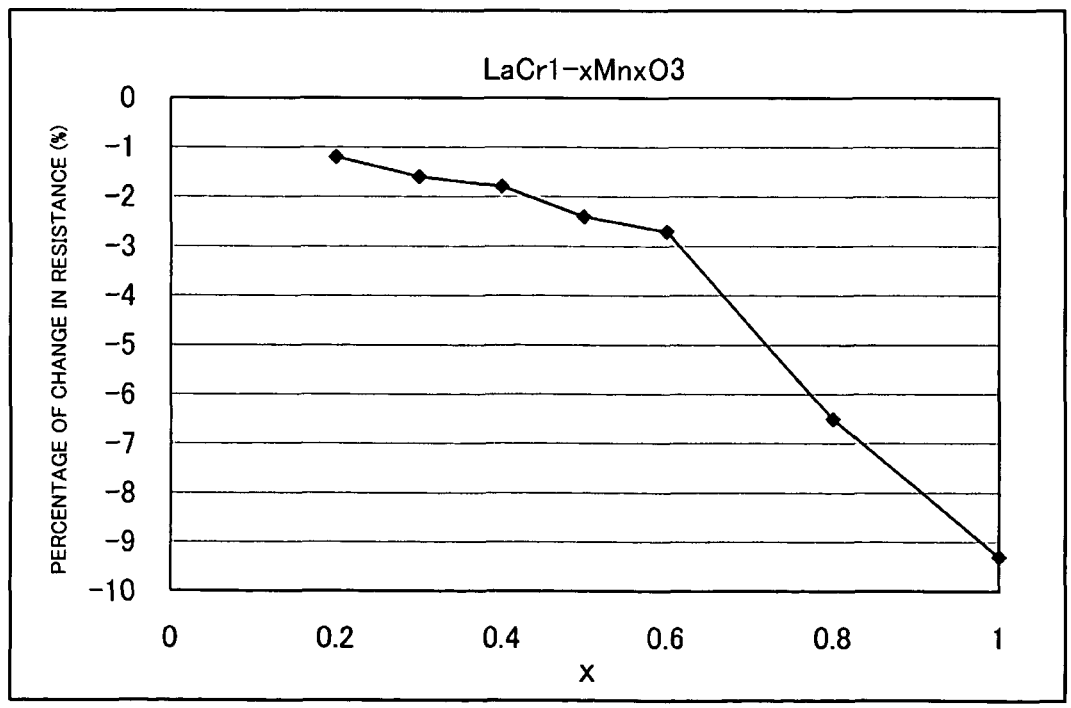
FIG. 4 is a graph which shows the percentage of change in resistance over storage time at 1000° C. with respect to the Mn ratio in a case in which the Mn ratio is varied in an example according to the present invention.

Furthermore, FIG. 4 shows the results obtained by examining the change in resistance in prototype samples of the metal oxide sintered compact 2 for a thermistor containing La($Cr_{0.5}$, $Mn_{0.5}$)$O_3$ as a principal component, which were obtained by varying the proportions of Cr and Mn, between the points in time before and after heat treatment in which the temperature was maintained at 1000° C. for 100 hours. As can be understood from the results, in a case in which the proportion of Mn exceeds 0.6, the change in the resistance becomes very much larger. It is thought that this is because oxygen deficiency readily occurs in a region having a large proportion of Mn (Mn>0.6), leading to a large change in the resistance. Accordingly, there is a need to set the proportion of Mn to 0.6 or less.

However, a proportion of Mn of 0.2 or less leads to difficulty in sintering. Such an arrangement requires a higher temperature for sintering. Accordingly, the proportion of Mn is preferably set to 0.2 or more.

Table 1 (table showing the production ratio between the main phase and an sub-phase ($La_2O_3$)) shows the results obtained by using powder X-ray analysis to measure the unreacted $La_2O_3$ content contained in prototype samples of the metal oxide sintered compact 2 for a thermistor according to the second embodiment, containing ($La_{1-y}Y_y$)($Cr_{0.5}Mn_{0.5}$)$O_3$ as a principal component, obtained by varying the proportions of La and Y. As can be understood from the results, in the composition range of a proportion of Y of 0.05 or more, the proportion of unreacted $La_2O_3$ is reduced. Where the proportion of Y is 0.2 or more, almost no $La_2O_3$ is observed. Accordingly, Y is more preferably set to a composition range of 0.2 or more.

TABLE 1

| | ($La_{1-y}Y_y$)($Cr_{0.5}Mn_{0.5}$)$O_3$ | |
|---|---|---|
| y | MAIN PHASE (mol %) La($Cr_{0.5}Mn_{0.5}$)$O_3$ + Y($Cr_{0.5}Mn_{0.5}$)$O_3$ | SUB-PHASE (mol %) $La_2O_3$ |
| 0 | 95 | 5 |
| 0.05 | 97 | 3 |
| 0.1 | 98 | 2 |
| 0.2 | 100 | NOT DETECTED |
| 0.5 | 100 | NOT DETECTED |

Table 1 (table showing the production ratio between the main phase and an sub-phase ($La_2O_3$)) shows the results obtained by using powder X-ray analysis to measure the unreacted $La_2O_3$ content contained in prototype samples of the metal oxide sintered compact 2 for a thermistor according to the third embodiment, containing (1−y)·La($Cr_{0.5}Mn_{0.5}$)$O_3$+y·$Mn_2CrO_4$ as a principal component, obtained by varying the proportions of La($Cr_{0.5}Mn_{0.5}$)$O_3$ and $Mn_2CrO_4$. As can be understood from the results, in the composition range of a proportion of Y of 0.05 or more, the proportion of unreacted $La_2O_3$ is reduced. Where the proportion of Y is 0.1 or more, almost no $La_2O_3$ is observed. Accordingly, Y is more preferably set to a composition range of 0.1 or more.

TABLE 2

| | (1 − y)La($Cr_{0.5}Mn_{0.5}$)$O_3$ + y·$Mn_2CrO_4$ | |
|---|---|---|
| y | MAIN PHASE (mol %) La($Cr_{0.5}Mn_{0.5}$)$O_3$ + $Mn_2CrO_4$ | SUB-PHASE (mol %) $La_2O_3$ |
| 0 | 95 | 5 |
| 0.05 | 98 | 2 |
| 0.1 | 100 | NOT DETECTED |
| 0.5 | 100 | NOT DETECTED |

It should be noted that the technical scope of the present invention is not limited to the above-described embodiments. Rather, various changes can be made without departing from the spirit of the present invention.

For example, as another embodiment of the above-described embodiment, a material obtained by adding $Y_2O_3$ to any one of the above-described composite oxides may be employed as a metal oxide sintered compact for a thermistor. That is to say, a metal oxide sintered compact may be employed, formed of a composite oxide represented by the general expression La($Cr_{1-x}Mn_x$)$O_3$ (with x=0.0 to 0.6)+$Y_2O_3$, a composite oxide represented by the general expression (1−y)·La($Cr_{1-x}Mn_x$)$O_3$+y·$Y_2O_3$ (with x=0.0 to 0.6, y=0.05 to 0.95), a composite oxide represented by the general expression ($La_{1-y}Y_y$)($Cr_{1-x}Mn_x$)$O_3$ (with x=0.0 to 0.6, y=0.05 to 0.95)+$Y_2O_3$, or a composite oxide represented by the general expression (1−y)·La($Cr_{1-x}Mn_x$)$O_3$+y·$Mn_2CrO_4$ (with x=0.0 to 0.6, y=0.05 to 0.95)+$Y_2O_3$.

Such metal oxide sintered compacts for a thermistor are each obtained by adding $Y_2O_3$, which is an insulating material, to any one of the aforementioned composite oxides, thereby providing high resistance in a simple manner by adding $Y_2O_3$.

Table 3 shows the results obtained by measuring, at 25° C., the resistance of prototype samples of metal oxide sintered compacts for a thermistor formed of composite oxides represented by (1−y)·La($Cr_{0.6}Mn_{0.4}$)$O_3$+y·$Y_2O_3$, according to another example of the present embodiment, which were formed with different proportions of Y. It should be noted that, in this case, each thermistor element has a structure including a metal oxide sintered compact for a thermistor having a cylindrical form with a diameter of 2 mm and a thickness of 1 mm, and Pt needles which are provided as leads having a diameter of 0.3 mm and arranged with an interval of 0.8 mm between them. Each thermistor element thus formed was measured. As can be understood from the results, the resistance was found to increase with an increase in the proportion of Y. As described above, the resistance can be adjusted according to the shape of the thermistor element by adjusting the proportion of Y.

TABLE 3

| $(1-y)La(Cr_{0.6}Mn_{0.4})O_3 + yY_2O_3$ | |
|---|---|
| y | RESISTANCE AT 25° C. |
| 0 | $1.5 \times 10^4$ |
| 0.3 | $6.3 \times 10^4$ |
| 0.5 | $1.7 \times 10^5$ |
| 0.6 | $2.7 \times 10^5$ |
| 0.7 | $1.2 \times 10^6$ |
| 0.75 | $8.9 \times 10^6$ |

In the second embodiment, such a manufacturing method as described above is preferably employed in which $La(Cr_{1-x}Mn_x)O_3$ is synthesized, following which the material thus synthesized is mixed with $Cr_2O_3$, $MnO_2$, and $Y_2O_3$, and the mixture is calcined. However, other manufacturing methods may be employed. For example, as another example, a manufacturing method may be employed in which $La_2O_3$, $Y_2O_3$, $Cr_2O_3$, and $MnO_2$, are mixed and calcined at the same time so as to obtain a calcined powder mixture represented by the expression $(La_{1-y}Y_y)(Cr_{1-x}Mn_x)O_3$ (with x=0.0 to 0.6, y=0.05 to 0.95), and the calcined powder thus formed is molded and sintered, thereby manufacturing a metal oxide sintered compact for a thermistor.

The invention claimed is:

1. A metal oxide sintered compact for a thermistor including a composite oxide represented by the general expression $La(Cr_{1-x}Mn_x)O_3$ (with x=0.0 to 0.6), wherein the metal oxide sintered compact for a thermistor includes a sintered compact represented by the general expression $(La_{1-y}Y_y)(Cr_{1-x}Mn_x)O_3$ (with x=0.0 to 0.6, y=0.05 to 0.95).

2. A metal oxide sintered compact for a thermistor according to claim 1, wherein, in the general expression, x is 0.2 to 0.6, and y is 0.2 to 0.95.

3. A metal oxide sintered compact for a thermistor including a composite oxide represented by the general expression $La(Cr_{1-x}Mn_x)O_3$ (with x=0.0 to 0.6), wherein the metal oxide sintered compact for a thermistor includes a sintered compact represented by the general expression $(1-y) \cdot La(Cr_{1-x}Mn_x)O_3 + y \cdot Mn_2CrO_4$ (with x=0.0 to 0.6, y=0.05 to 0.95).

4. A metal oxide sintered compact for a thermistor according to claim 3, wherein, in the general expression, x is 0.2 to 0.6, and y is 0.1 to 0.95.

5. A metal oxide sintered compact for a thermistor including a composite oxide represented by the general expression $La(Cr_{1-x}Mn_x)O_3$ (with x=0.0 to 0.6), wherein the composite oxide contains $Y_2O_3$.

6. A metal oxide sintered compact for a thermistor according to claim 1, wherein the composite oxide contains $Y_2O_3$.

7. A metal oxide sintered compact for a thermistor according to claim 3, wherein the composite oxide contains $Y_2O_3$.

8. A thermistor element including:
a metal oxide sintered compact for a thermistor according to claim 3; and
a pair of leads, one terminal of each of which is fixed to the metal oxide sintered compact for a thermistor.

9. A thermistor element including:
a metal oxide sintered compact for a thermistor according to claim 5; and
a pair of leads, one terminal of each of which is fixed to the metal oxide sintered compact for a thermistor.

10. A thermistor temperature sensor including a thermistor element according to claim 8.

11. A thermistor temperature sensor including a thermistor element according to claim 9.

12. A manufacturing method for a metal oxide sintered compact used for a thermistor, including a step in which $La_2O_3$, $Cr_2O_3$, $MnO_2$, and $Y_2O_3$, provided in the form of powder, are mixed and calcined so as to obtain mixture calcined powder represented by $(La_{1-y}Y_y)(Cr_{1-x}Mn_x)O_3$ (with x=0.0 to 0.6, y=0.05 to 0.95).

13. A manufacturing method for a metal oxide sintered compact used for a thermistor, including:
mixing and calcining $La_2O_3$, $Cr_2O_3$ and $MnO_2$ to obtain a calcined powder of composite oxide represented by the general expression $La(Cr_{1-x}Mn_x)O_3$ (with x=0.0 to 0.6), wherein each of $La_2O_3$, $Cr_2O_3$ and $MnO_2$ is in a powder form;
adding and mixing additional $Cr_2O_3$, $MnO_2$, and $Y_2O_3$, each in the form of powder with the calcined powder of the composite oxide to obtain a mixture, and calcining the mixture to obtain a calcined powder mixture represented by $(La_{1-y}Y_y)(Cr_{1-x}Mn_x)O_3$ (with x=0.0 to 0.6, y=0.05 to 0.95); and
molding and sintering the calcined powder mixture.

14. A manufacturing method for a metal oxide sintered compact used for a thermistor, including:
a step in which $La_2O_3$, $Y_2O_3$, $Cr_2O_3$, and $MnO_2$, provided in the form of powder, are mixed and calcined so as to obtain calcined powder of a composite oxide represented by $(La_{1-y}Y_y)(Cr_{1-x}Mn_x)O_3$ (with x=0.0 to 0.6, y=0.05 to 0.95); and
a step in which the calcined powder thus obtained is molded and sintered.

15. A manufacturing method for a metal oxide sintered compact used for a thermistor, including a step in which mixture powder obtained by adding surplus quantity of $Cr_2O_3$ and $MnO_2$ as compared with $La_2O_3$ is sintered so as to obtain a mixture sintered compact represented by the general expression $(1-y) \cdot La(Cr_{1-x}Mn_x)O_3 + y \cdot Mn_2CrO_4$ (with x=0.0 to 0.6, y=0.05 to 0.95).

* * * * *